(No Model.)
N. GERBER.
MILK CAN.
No. 311,975. Patented Feb. 10, 1885.
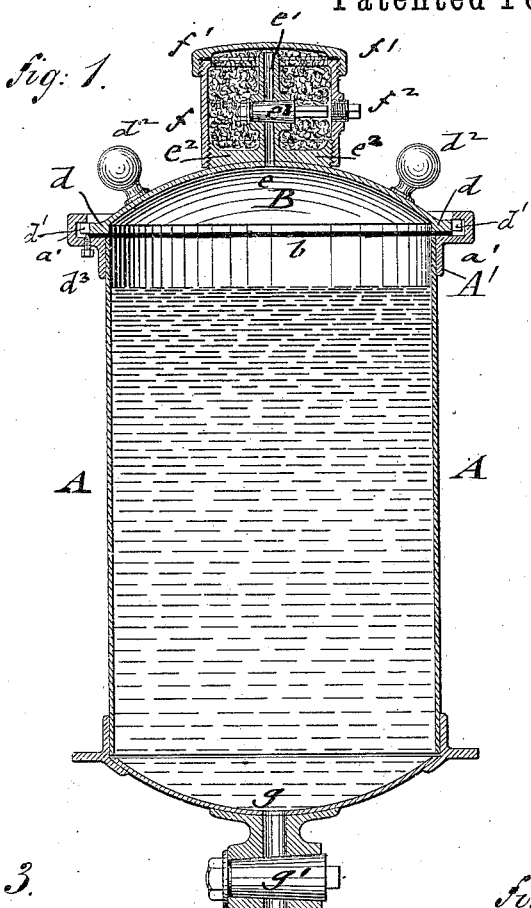
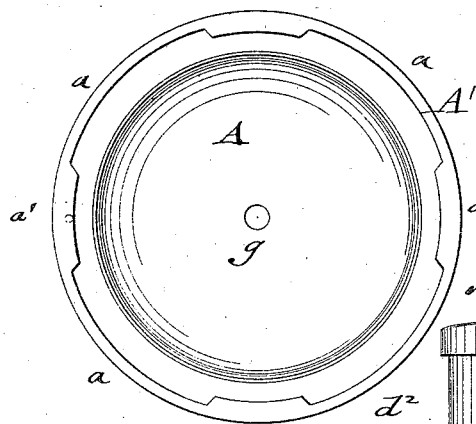
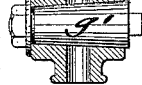
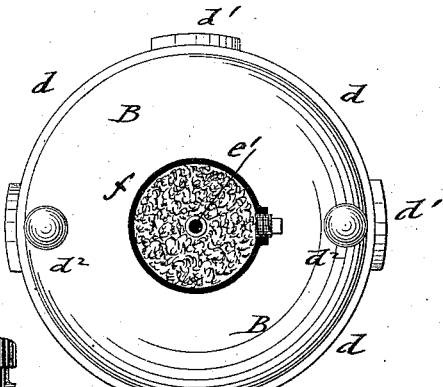
WITNESSES:
A. Schehl
Jos. N. Rosenbaum.
INVENTOR
Nicholas Gerber
BY Goepel & Raegener
ATTORNEYS

UNITED STATES PATENT OFFICE.

NICHOLAS GERBER, OF LITTLE FALLS, NEW YORK.

MILK-CAN.

SPECIFICATION forming part of Letters Patent No. 311,975, dated February 10, 1885.

Application filed October 8, 1883. Renewed July 18, 1884. (No model.)

*To all whom it may concern:*

Be it known that I, NICHOLAS GERBER, of Little Falls, in the county of Herkimer and State of New York, have invented certain new and useful Improvements in Milk-Cans, of which the following is a specification.

Milk has heretofore been shipped in closed cans from the dairies to the places of use, and had to be delivered to the consumers as soon as possible after it came from the cows. Milk may, however, also be shipped in a condensed state, in which form it can be preserved a longer time, but requires the use of sugar or chemicals for its preservation.

The object of this invention is to furnish an improved milk-can by which larger quantities of fresh milk can be supplied to customers and kept in a state of preservation until entirely used up, so as to dispense with the necessity of daily service; and the invention consists of a metallic vessel of a suitable size that is hermetically closed by a detachable cover and provided with a vent-opening and a bottom discharge-faucet. The vent-opening is surrounded with a chamber containing filtering and disinfecting substances, through which the air has to percolate on its passage to the vent-opening when the contents are drawn off.

In the accompanying drawings, Figure 1 represents a vertical section of my improved milk-can. Fig. 2 is a top view of the cover, partly in section through the air-disinfecting chamber. Fig. 3 shows a top view of the can with the cover removed, and Fig. 4 is a side view of the cover and its air-disinfecting chamber.

Similar letters of reference indicate corresponding parts.

In the drawings, A represents the body of my improved milk-can, which is made of sheet metal of suitable strength, and preferably of cylindrical shape.

To the upper edge of the body A is riveted an outwardly-bent circumferential flange, A', having lugs $a'$ of U shape in cross-section and with tapering inner edges, as shown in Fig. 1 and in dotted lines in Fig. 4. An elastic ring or gasket, $b$, is interposed between the flange $a$ and the cover B, to secure a hermetical closing of the cover B on the vessel A. The cover B is provided with a circumferential flange, $d$, that rests upon the elastic ring $b$, and with wedge-shaped projecting lugs $d'$, that engage the tapering edges of the lugs $a'$ when the cover is placed in position on the vessel A and turned on its axis by the handles or knobs $d^2$. A clamp-screw, $d^3$, passes through one of the lugs $d'$, so as to secure thereby the cover rigidly in closed position while the can is shipped or in use. When it is desired to clean the can, the clamp-screw $d^3$ is loosened and the cover turned so as to clear the lugs, and then removed.

In place of the locking devices described, any other means by which the cover may be hermetically secured to the body A may be used.

The cover B is provided with a vent-opening, $e$, from which extends a vent-tube, $e'$, that is riveted or otherwise secured by a disk-shaped base, $e^2$, to the cover. The vent-tube $e'$ is provided, as close as possible to the cover B, with a stop-cock, $e^3$, having a spindle with a square head for applying thereto a key for opening or closing the stop-cock $e^3$. The vent-tube $e'$ is surrounded by a cylindrical casing, $f$, having a detachable screw-cap, $f'$, which casing incloses and protects the vent-tube. The casing $f$ is tightly screwed onto the circumference of the base $e^2$, and forms with the same a chamber that can be filled with substances for filtering and disinfecting the air that is drawn in to give vent when the faucet at the bottom of the can is opened for drawing off some of the contents of the can. The casing $f$ is provided, in line with the spindle of the stop-cock $e^3$, with an opening closed by a screw-plug, $f^2$, which latter has to be first unscrewed by the key before the stop-cock $e^3$ of the vent-tube $e'$ can be opened. The interior of the casing $f$ is filled with cotton or other suitable material, through which the air is compelled to pass, so as to be cleaned of dust or other impurities. This filtrating material is saturated with a suitable disinfectant, which latter is vaporized while the can is exposed to heat preparatory to shipping, so that the vapors fill the disinfecting-chamber and kill thereby any organic germs that induce fermentation when air is drawn through the chamber and vent-tube to the interior of the vessel A. The bottom of the can is provided with a central discharge-pipe, $g$, and faucet $g'$, by which the milk is drawn off.

For filling my improved milk-can, the stop-cock $g'$ is closed and the can then filled with fresh or condensed milk, after which the cover is secured in position. The stop-cock $e^3$ is closed and the screw-plug $f^2$ of the casing $f'$ inserted. The filtering material in the disinfecting-chamber is next saturated with the disinfecting-liquid, and the chamber closed by screwing on the cap $f'$. The milk-can is next subjected for a determinate time to the action of such a temperature that the organic germs in the milk are destroyed. Each milk-can is then placed in a wooden casing and shipped to the place of use.

When some of the milk is desired for use, the screw-plug $f^2$ is first removed and the stop-cock $e^3$ of the vent-tube opened, after which the discharge-cock $g'$ is opened and the necessary quantity withdrawn. The air is drawn into the can through the side opening of the disinfecting-chamber and through the vent-tube $e'$, and purified in its passage through the filtering and disinfecting material of impurities and organic germs which might induce fermentation. Milk can thus be preserved for a considerable length of time, until the entire quantity is used.

The advantages of my improved milk-can are as follows: First, the milk can be furnished in large quantities to the consumer, so as to supply him for a considerable length of time, dispensing with the daily serving of the same and its inconveniences; second, its original taste, smell, and color are preserved, as the organic germs originally in the milk have been destroyed, and impurities and organic germs are prevented from entering into the can; third, the milk can be carried and shipped from points at considerable distance from large cities, whereby the milk can be supplied at a lower rate; fourth, milk of uniform quality and hygienic value is thereby supplied in place of the ordinary milk of varying quality.

Having thus described my invention, I claim as new and desire to secure by Letters Patent—

1. The combination of a milk-can having a bottom discharge-faucet, a hermetically-sealing cover having an air-vent, and an air filtering and disinfecting chamber inclosing the air-vent, substantially as set forth.

2. The combination of a milk-can having a bottom discharge-faucet, a detachable cover, means for attaching the cover hermetically to the can, a valved vent-opening, and an air filtering and disinfecting chamber inclosing the vent-opening, substantially as set forth.

In testimony that I claim the foregoing as my invention I have signed my name in presence of two subscribing witnesses.

NICHOLAS GERBER.

Witnesses:
ERASTUS H. SMITH,
JOHN W. FITZGERALD.